March 23, 1937. H. R. GOTTHARDT ET AL 2,074,901
GREASE RETAINING DEVICE
Filed Jan. 31, 1935
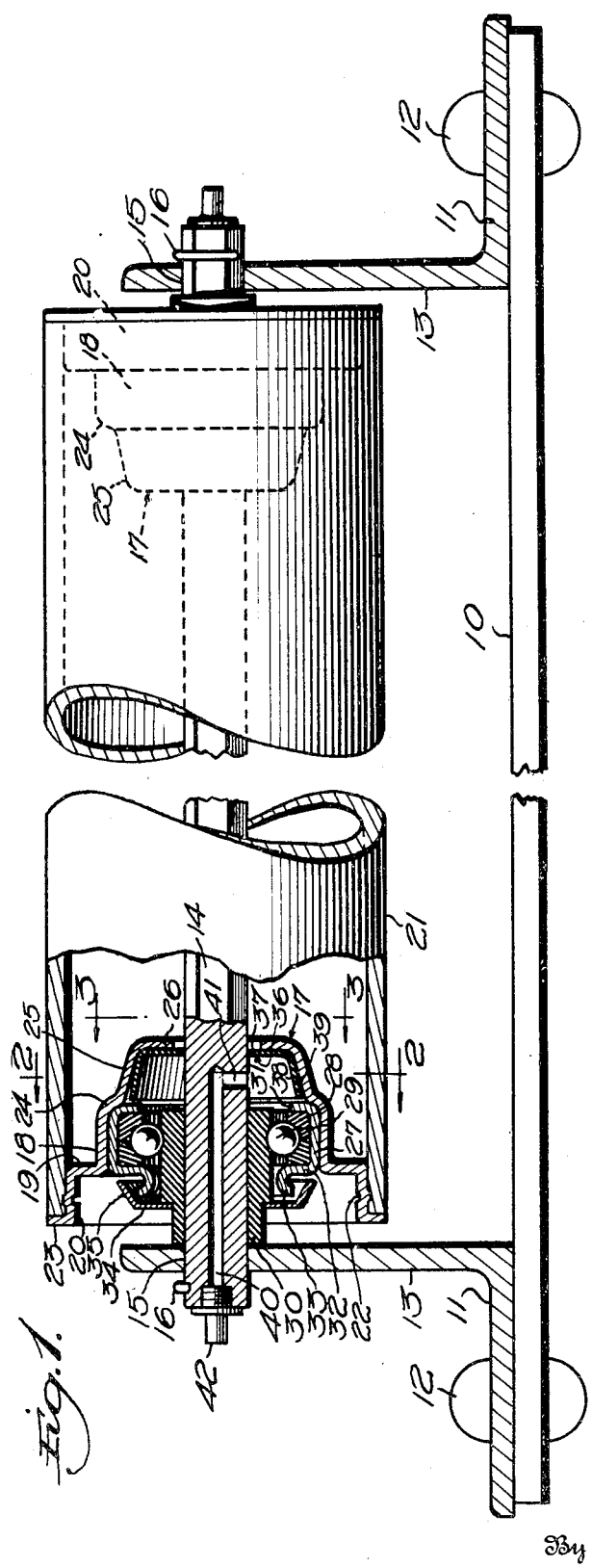
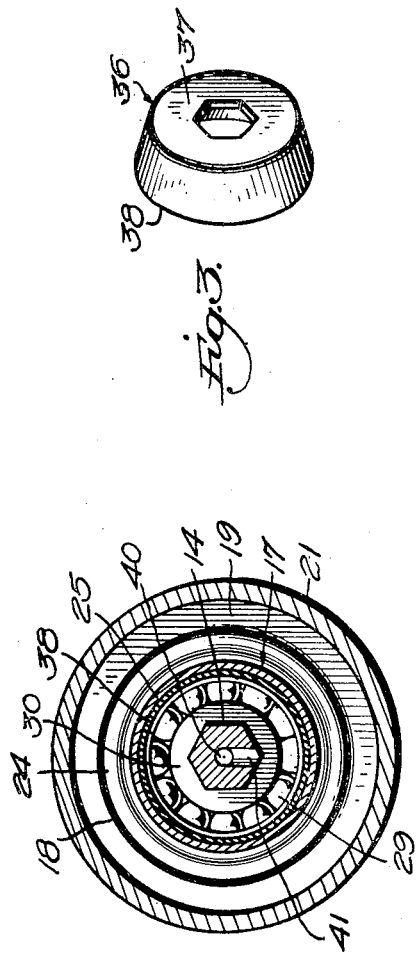
Inventors
H. R. GOTTHARDT
E. C. LOGAN Patented Mar. 23, 1937

2,074,901

UNITED STATES PATENT OFFICE 2,074,901

GREASE RETAINING DEVICE

Henry R. Gotthardt and Edward C. Logan, Louisville, Ky., assignors to Logan Co. Inc., Louisville, Ky., a corporation of Kentucky Application January 31, 1935, Serial No. 4,386

3 Claims. (Cl. 308—187.1)

This invention relates to grease retaining devices, and more particularly to grease retaining means for use in connection with the rolls of gravity conveyors.

It is the common practice to mount gravity conveyor rollers on their supporting shafts by means of anti-friction bearings arranged in the ends of the rollers, and suitable grease fittings are employed for supplying lubricant to the bearings. For the purpose of preventing the loss of grease into the interior of the rolls, the bearing housings ordinarily are provided with felt washers which are rotatable with the bearing housings and engage the supporting shaft for the roller.

The use of felt washers as packing means has been found to be rather unsatisfactory for several reasons. For example, gravity conveyor rollers are not made in accordance with precision methods and accordingly it rarely occurs that the grease retaining washers are perfectly concentric with the shaft. Thus a space usually exists between the felt washer and the shaft through which grease can escape to the interior of the roll.

Moreover, the washers usually fit snugly at one side against the shaft, and when such side of the washer wears due to this friction against the shaft, a larger opening permits the escape of the grease when the worn side of the washer is adjacent the side of the shaft opposite the point at which the wearing takes place. Thus the grease is permitted to escape rather freely into the roll at each introduction of lubricant into the bearings.

It further has been found that in order to be effective to any substantial extent, felt washers must fit relatively snugly against the shafts, and thus it will be apparent that the rolls are extremely sluggish in action when new due to the friction existing between the washers and the shafts. It further has been found that felt washers have a strong tendency to shrink and harden with age, thus rendering their use disadvantageous for this further reason.

An important object of the present invention is to provide a simple and novel type of grease retaining means capable of use with various types of bearing structures and particularly intended for use with the bearings of gravity conveyor rolls to prevent the loss of grease from one side of a bearing when grease is introduced into the bearing.

A further object is to provide a device of the character referred to which is particularly adapted for use with the bearings of gravity conveyor rolls to seal the inner ends of the bearing structures upon the introduction of grease into the bearings, to thus prevent the escape of grease into the interior of the roll.

A further object is to provide a grease retaining device of the character indicated which is not subject to the disadvantages of felt washers, and which lasts over long periods of time without introducing any substantial element of friction tending to retard the rotation of the rolls.

A further object is to provide a retaining device of the character indicated which is operative under the influence of the pressure of the grease being introduced into the bearings to prevent the escape of grease into the conveyor roll.

A further object is to provide a metallic grease retainer in the form of a cup surrounding the shaft of a conveyor roll and engageable against the main bearing cup of the roll when grease is introduced into the bearing, to prevent the escape of grease into the roll.

Other objects and advantages of the invention will become apparent during the course of the following description.

In the drawing we have shown one embodiment of the invention. In this showing—

Figure 1 is a transverse sectional view through a portion of a gravity conveyor showing one of the conveyor rolls partly in elevation, parts being broken away, Figure 2 is a section on line 2—2 of Figure 1, and, Figure 3 is a perspective view of the grease retaining cup.

Referring to Figure 1, the numeral 10 designates the base of an ordinary gravity conveyor having parallel supporting rails 11 secured thereto by rivets 12 or other fastening means. The rails 11 include the usual spaced vertical portions 13 which support a plurality of shafts, one of which is shown in the drawing and indicated by the numeral 14. In the present instance such shaft is shown as being hexagonal, but it will become apparent that any desired type of shaft may be employed. These shafts project through openings 15 in the rails of the same cross-sectional shape as the shaft to prevent rotation of the latter, and the shaft is retained in position by suitable spring clips 16.

The bearing structures in opposite ends of the rolls are identical, and only one need be referred to in detail. Referring to Figure 1, the numeral 17 designates a bearing supporting cup having a cylindrical portion 18 intermediate its ends. Adjacent the cylindrical portion 18, the cup extends outwardly to form a radial flange 19 and then longitudinally to form a cylindrical flange 20 which fits into the end of the conveyor roll 21. The cylindrical flange 20 is secured within the end of the roll by deep prick punching, as at 22. Outwardly of the flange 20 the cup 17 is provided with a radial flange 23 which seats against the adjacent end of the roll. Inwardly of the cylindrical portion 18, the cup 17 is shouldered inwardly as at 24, and beyond such shouldered portion the cup is tapered as at 25 and terminates in an inwardly extending radial flange 26, the inner edge of which is spaced from the shaft 14.

The cylindrical portion 18 of the cup forms a support for the bearing means of the roller. Such bearing means includes a cup 27 frictionally engageable within the cylindrical portion 18 of the cup 17 and seating against the shoulder 24. The cup 27 contains an outer ball race 28 shown as comprising a pair of complementary rings, and anti-friction balls 29 are arranged within the race 28 and engage an inner race formed as a sleeve 30 snugly fitting the shaft 14.

The bearing structure preferably includes a labyrinth arrangement at its outer end to assist in preventing the entrance of dust and other foreign material into the bearing. In the present instance the cup 27 is shown as being provided with opposite internal radial flanges 31 and 32 to retain the outer ball race in position and the flange 32 terminates in a curved annular portion 33 arranged within a dust seal 34, secured to the inner ball race 30 and having an outer angular annular flange 35 overhanging the cup portion 33 to exclude dust from the ball race. While the use of this feature is preferable it forms no part of the present invention.

In order to efficiently prevent the escape of lubricant from the bearings into the interior of the roll, a pressed steel sealing cup indicated as a whole by the numeral 36 is arranged within the tapered portion 25 of the cup 17. The sealing cup includes a radial flange 37 having its inner edge of a shape and size to fit around the shaft 14. It will become apparent however, that the cup 36 may be employed to equal advantage in connection with a shaft of circular cross-section, since it is not essential to the operation of the invention that the sealing cup be fixed with respect to the shaft.

The cup 36 further includes a tapered flange portion 38 lying within the tapered flange 25. Particular attention is invited to the fact that the flange 38 tapers to a slightly less degree than the flange 25 and accordingly it will be apparent that the free edge of the flange 38 is spaced slightly from the adjacent portion of the flange 25, as indicated by the numeral 39. The space within the sealing cup forms a lubricant reservoir, and the space 39 permits the entrance of a small amount of lubricant between the flanges 25 and 38 for a purpose to be described. The shaft 14 is drilled axially as at 40 to provide a lubricant passage which communicates at its inner end with the interior of the sealing cup 36 through a transverse passage 41. Any suitable type of grease fitting 42 is mounted in the end of the shaft to permit grease to be supplied to the outer end of the passage 40 under pressure.

The operation of the device is as follows:

The sealing cup 36 is loosely mounted on the shaft 14 and accordingly is free to move longitudinally of the shaft 14 to a slight extent with respect to the flange 26 and tapered cup portion 25. The roll 21 operates in the usual manner as one of a series of rolls forming a gravity conveyor, and packages moving over the rolls effect rotation thereof. Since the sealing cup 36 is not held in tight engagement with the adjacent portions of the cup 17, it will be apparent that it does not tend to retard rotation of the roll 21, thus permitting the anti-friction bearings to function to reduce the friction of the roll. As previously stated, felt retaining washers are effective to a substantial extent only when new and at such time they snugly fit the shaft so as to render the action of the roll sluggish to a substantial extent. It is only after such a washer has become worn that it permits free rotation of the roll, and under such conditions it is largely ineffective for preventing grease from escaping into the interior of the roll. It will be apparent that the present device is effective even after long use for preventing the loss of grease.

Grease is introduced into the interior of the bearing structure through the grease fitting 42, which may be of any conventional type. The grease is forced through the passages 40 and 41 into the interior of the cup 36 and creates a pressure against the cup tending to move it endwise into snug engagement with the flange 26. Thus grease is prevented from escaping around the outside of the cup 36 and into the roll, and the inner edge of the flange 37 fits sufficiently closely to the shaft 14 to prevent any substantial escape of grease around the shaft 14. The grease thus introduced is forced forwardly from the cup 36 into the interior of the bearing structure proper to provide effective lubrication for the anti-friction bearings. While the dust seal 34 largely minimizes the entrance of dust into the bearings, such entrance of dust cannot be completely prevented. It will be apparent, however, that at each introduction of lubricant into the device, old grease previously introduced will be forced forwardly around the dust seal, thus moving any foreign material away from the bearings.

The grease introduced into the device is distributed in the manner referred to, and a small amount of this grease enters the space 39 between the flange 26 and the tapered cup portion 25, and a slight amount of this grease, sufficient for lubricating purposes, finds its way between the flanges 26 and 37 to prevent the building up of friction between the surfaces of these elements. As previously stated, the cup 36 is formed of pressed steel, and since it bears against the adjacent portions of the cup 17 only when grease is being introduced under pressure, it will be apparent that the cup 36 is not subjected to any substantial amount of wear and will last almost indefinitely.

From the foregoing it will be apparent that the present device is extremely simple in construction and may be cheaply manufactured. The device is far more advantageous in every respect than the conventional felt washers employed for the same purpose. It is highly efficient after long periods of use as distinguished from a felt washer, and introduces no more friction into the operation of the roll when new than after long periods of time, as distinguished from felt washers although the cup lasts substantially indefinitely, as previously stated, and is not affected by age as is true of felt washers.

It is to be understood that the form of our invention herewith shown and described is to be taken as a preferred example of the same and that various changes in the shapes, size and arrangement of parts may be resorted to without departing from the spirit of the invention or the scope of the subjoined claims.

We claim:

1. A bearing structure comprising a shaft, a roll surrounding said shaft, a cup having an annular wall snugly fitting within the end of said roll, said cup inwardly of said annular portion being tapered to decrease in size away from said annular portion and terminating in an inwardly extending radial flange having an axial opening through which said shaft extends, bearing means arranged between said shaft and the annular portion of said cup, a sealing member arranged in said cup between said bearing means and said radial flange, said sealing member having a radial flange portion provided with an opening corresponding in shape and size to said shaft to slidably receive the latter and being further provided with a tapered flange portion increasing in diameter toward its free end, the smaller end of said tapered flange substantially fitting within the smaller end of the tapered portion of said cup and being tapered to a less degree than the latter, and means for supplying lubricant under pressure to the interior of said sealing member.

2. A bearing structure comprising a shaft, a roll surrounding said shaft, a cup arranged within one end of said roll and secured thereto, said cup having its open end facing in the direction of the end of said roll and having its inner end tapered to decrease in size away from the end of said roll and terminating in an inwardly extending radial flange having an axial opening through which said shaft extends, bearing means arranged between said shaft and the open end of said cup, a sealing member arranged in said cup between said bearing means and said radial flange, said sealing member having a radial flange provided with an opening corresponding in shape and size to said shaft to slidably receive the latter and being further provided with a tapered flange portion increasing in diameter toward its free end, at least a portion of said sealing member having annular engagement with said cup, and means for supplying lubricant under pressure to the interior of said sealing member.

3. A bearing device comprising a shaft, an annular member surrounding said shaft, a bearing assembly arranged between said shaft and said member, a pair of cup shaped lubricant sealing members one fixed against rotation with respect to said annular member and having a substantially radial wall provided with a central opening through which said shaft extends, the other sealing member comprising a flange portion and a substantially radial wall arranged in proximity to said first named radial wall and provided with a central opening slidably fitting said shaft, and means for introducing lubricant into the interior of said second named sealing member, the edge of the flange portion of said second named sealing member being engageable with said bearing assembly to positively maintain the radial wall of said second named sealing member in close proximity to the radial wall of said first named sealing member.

HENRY R. GOTTHARDT.
EDWARD C. LOGAN.